US007048092B2

(12) United States Patent
Gomes Junior

(10) Patent No.: US 7,048,092 B2
(45) Date of Patent: May 23, 2006

(54) HELICAL RAMP LIFE-PRESERVER

(76) Inventor: Jason De Carvalho Gomes Junior, Rua Victorio Viezzer, n° 133 - Vista Alegre das Mercês, Curitiba, Paraná (BR)

( * ) Notice: Subject to any disclaimer, the term of this patent is extended or adjusted under 35 U.S.C. 154(b) by 0 days.

(21) Appl. No.: 10/181,010

(22) PCT Filed: Jan. 9, 2001

(86) PCT No.: PCT/BR01/00003

§ 371 (c)(1),
(2), (4) Date: Nov. 7, 2002

(87) PCT Pub. No.: WO01/51129

PCT Pub. Date: Jul. 19, 2001

(65) Prior Publication Data

US 2003/0116381 A1 Jun. 26, 2003

(30) Foreign Application Priority Data

Jan. 10, 2000 (BR) .................................... 0000833

(51) Int. Cl.
*A62B 1/20* (2006.01)
*B65G 11/06* (2006.01)
*A63G 21/18* (2006.01)
*A63G 21/00* (2006.01)

(52) U.S. Cl. .......................... 182/48; 193/12; 472/117; 104/70

(58) Field of Classification Search .................. 182/48, 182/49, 82; 114/375, 395; 193/25 R, 12; 472/117, 128; 104/69, 70
See application file for complete search history.

(56) References Cited

U.S. PATENT DOCUMENTS

| | | | | |
|---|---|---|---|---|
| 258,247 | A * | 5/1882 | Nicholson | 182/47 |
| 916,100 | A * | 3/1909 | Brown | 182/48 |
| 1,194,098 | A * | 8/1916 | Viezzi | 182/18 |
| 1,754,375 | A * | 4/1930 | Sturges | 182/48 |
| 3,968,856 | A * | 7/1976 | Keen et al. | 182/48 |
| 4,049,080 | A * | 9/1977 | Suzuki | 182/48 |
| 4,194,733 | A * | 3/1980 | Whitehouse, Jr. | 472/117 |
| 4,865,311 | A * | 9/1989 | Beekenkamp | 182/48 |
| 6,102,762 | A * | 8/2000 | Bell et al. | 182/48 |
| 6,467,575 | B1 * | 10/2002 | Chen | 182/48 |

FOREIGN PATENT DOCUMENTS

GB 2101054 A * 1/1983

* cited by examiner

*Primary Examiner*—Hugh B. Thompson, II
(74) *Attorney, Agent, or Firm*—The Kline Law Firm

(57) ABSTRACT

The present Patent of invention “HELICAL RAMP LIFE-PRESERVER” refers to a model of helical ramp, aimed for collective use, for immediate rescue of lives subjected to a probable fire, to be used in buildings of any height, or in places that cannot be reached by the devices currently in use, such as “Magirus” stairs, or even in those where these devices can reach, but a probable delay to help would put in risk people’s life in an eventual emergency state.

13 Claims, 9 Drawing Sheets

HELICAL RAMP LIFE-PRESERVER

BACKGROUND OF THE INVENTION

This application is a 371 of PCT/BR01/00003, filed Jan. 9, 2001.

FIELD OF THE INVENTION

The present invention uses a helical ramp for immediate rescue of lives subjected to the hazard of a fire. The system can be used in buildings of any height, or in places that cannot be reached by the devices currently in use, such as "Magirus" stairs, or even in those places where these devices can reach, but a probable delay would put people's lives in an emergency state.

DESCRIPTION OF THE PRIOR ART

Currently, it happens that in most of the fires in buildings, delay of firemen's arrival is due to traffic jams or other difficulties, or of the remoteness of the location, or even because of inadequate equipment. These facts lead to negative rescue statistics in large fires. Other hazards arise due to stairways in closed spaces being filled with smoke, and therefore being impassable due to lack of oxygen. Even if stairs are accessible, handicapped people, old people, and also children and pets may still be at risk.

Fire extinguishers can reduce fire hazards, but they are often not properly maintained, and can be inadequate for large fires at any rate.

SUMMARY OF THE INVENTION

The present invention was developed to preserve the lives of people and animals that work or live in buildings. The system utilizes a helical ramp, intended for collective use, for the immediate rescue of those subjected to a fire. The system is intended to be used in buildings of any height, or in places that cannot be reached by the devices currently in use, such as "Magirus" stairs. The system can also be used where prior art devices can reach, but where a delay in assistance would put at risk people's lives in an emergency. The design of the helical ramp aims to help any kind of rescue, filling gaps in the current techniques, and to solve the present problems of fire emergency systems.

DETAILED DESCRIPTION OF THE INVENTION

Figure 1:
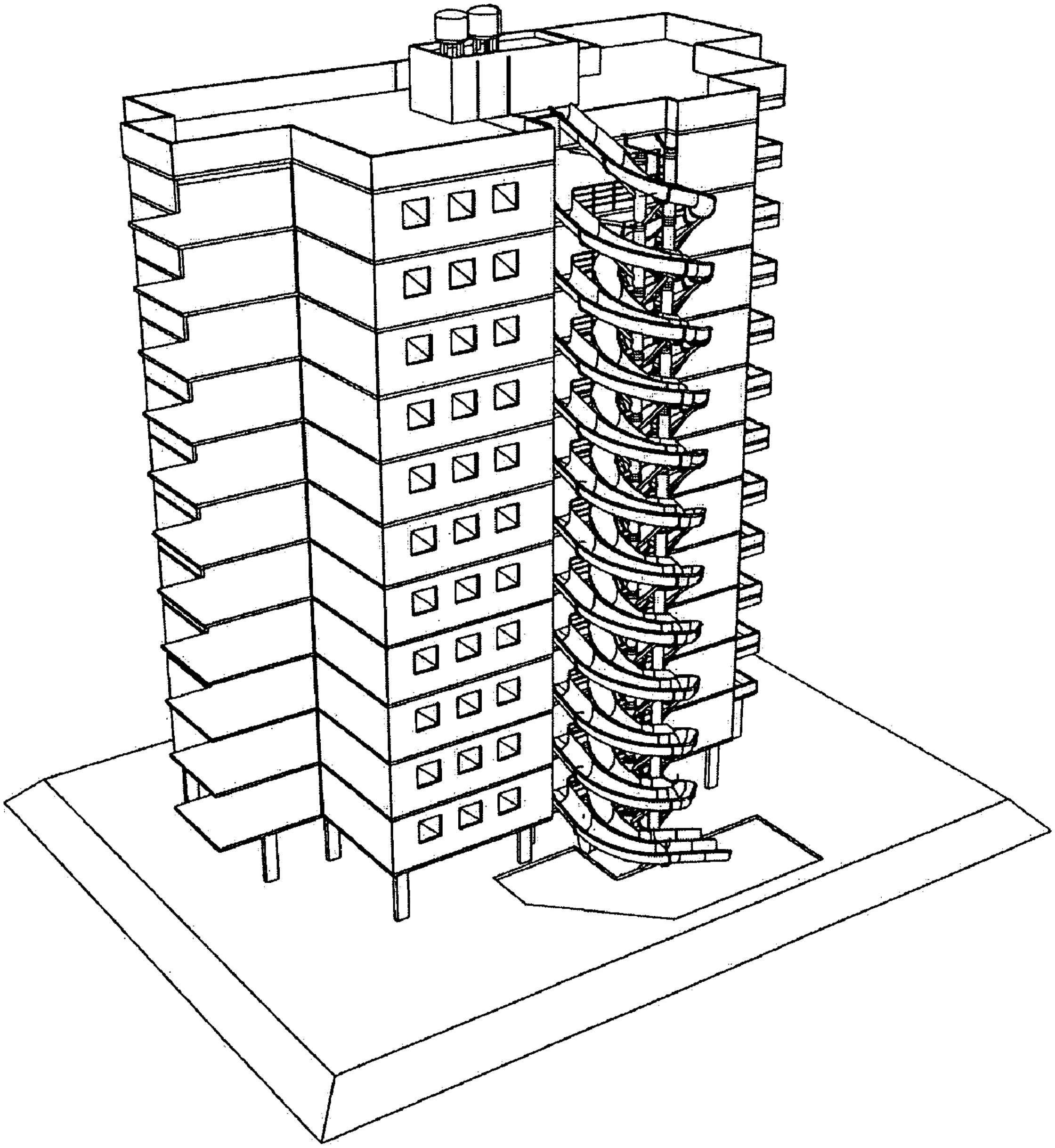
FIG. 1 is a perspective view of a building with a ramp system of the present invention using dual ramps.
Figures 2, 2A:
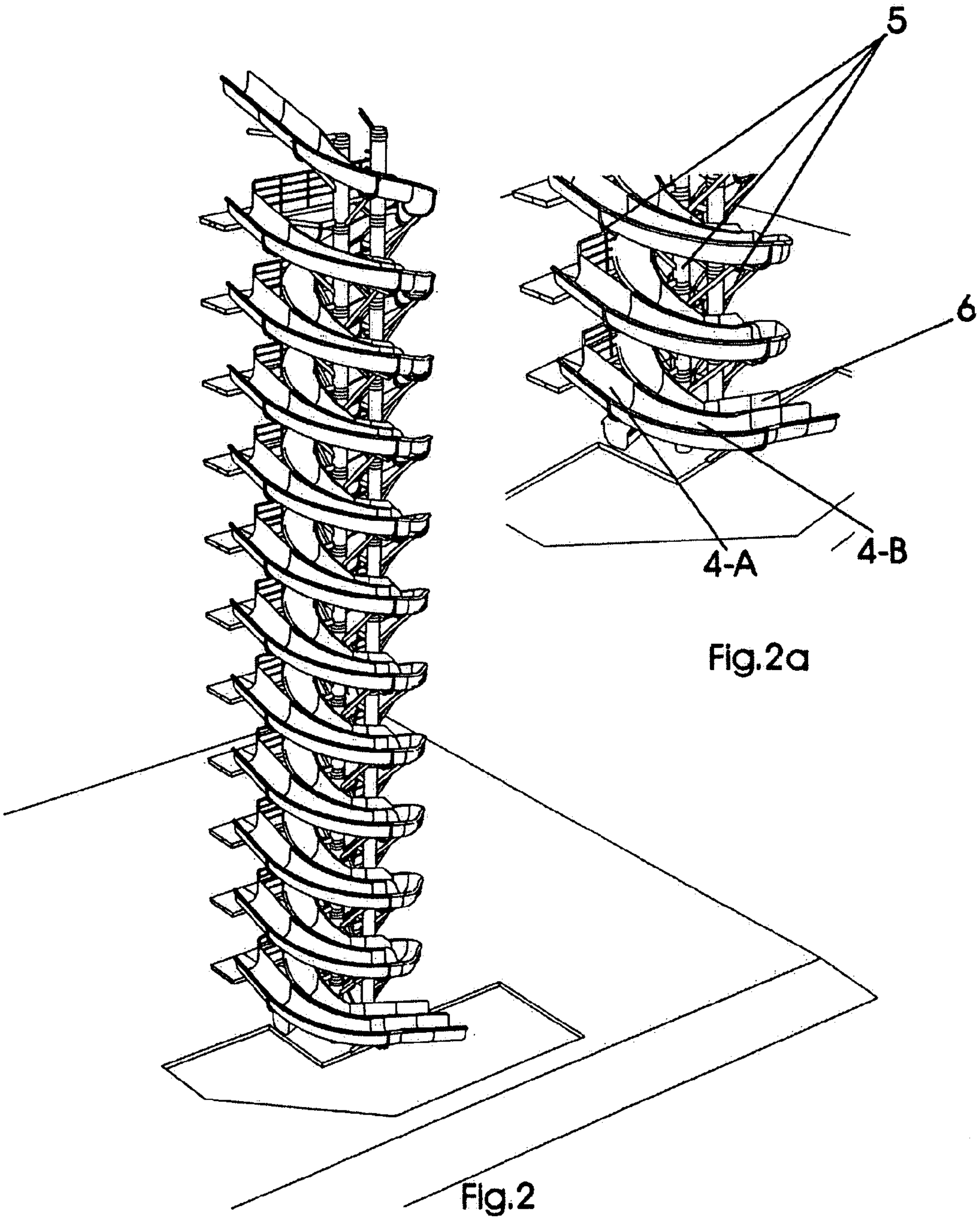
FIG. 2 is a perspective view of the dual ramp itself.
FIG. 2*a* is a detail view of sections of the ramp shown in FIG. 2.
Figure 3:
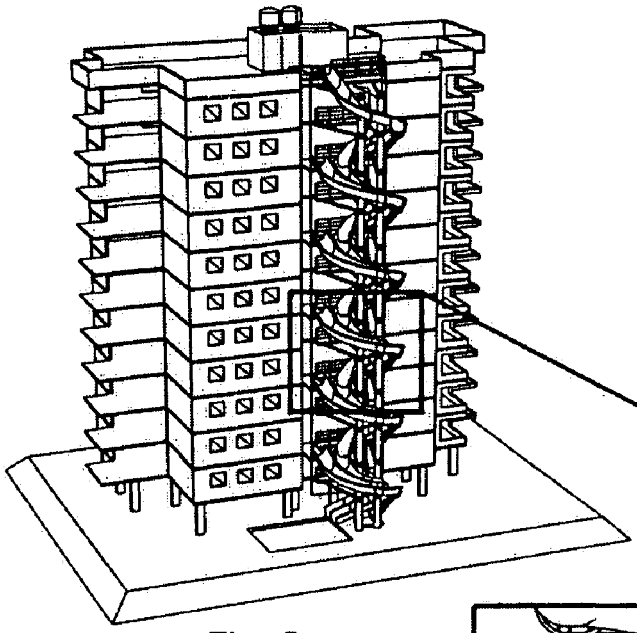
FIG. 3 is a perspective view of a building with a ramp system installed.
Figure 3A:
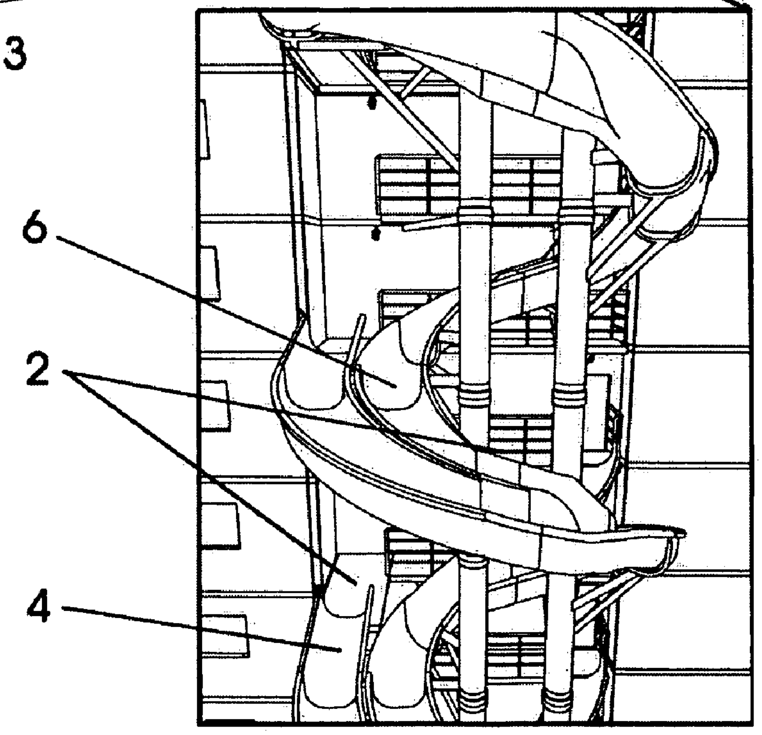
FIG. 3*a* is a detail view of the outlined sections of the ramp shown in FIG. 3.
Figure 4:
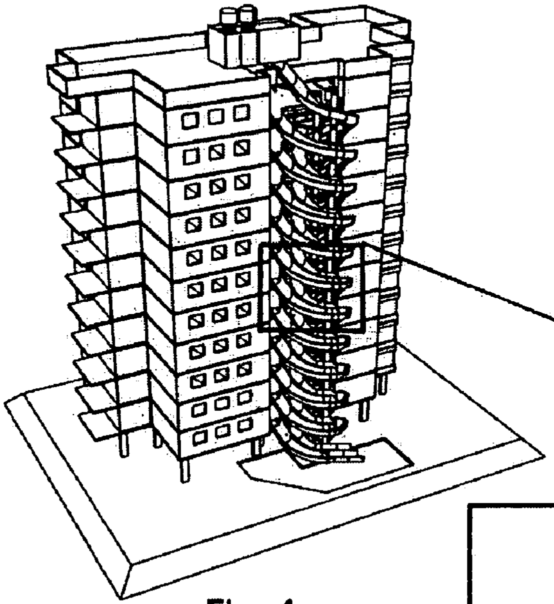
FIG. 4 is a perspective view of a building with a ramp system with two ramps installed.
Figure 4A:
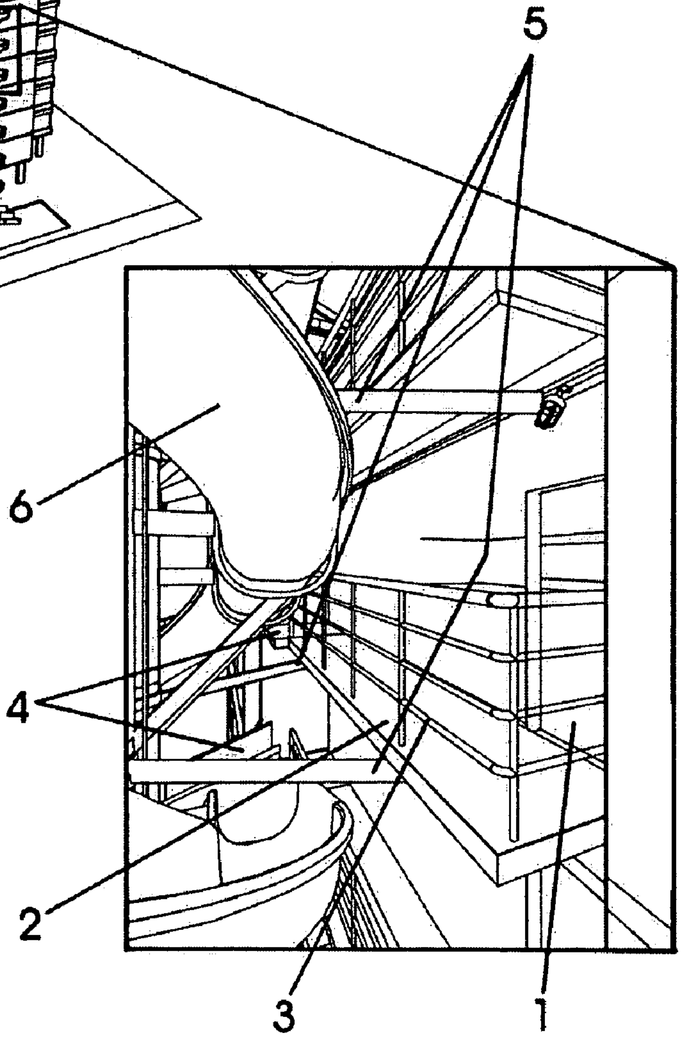
FIG. 4*a* is a detail view of the outlined sections of the ramp shown in FIG. 4.
Figure 5:
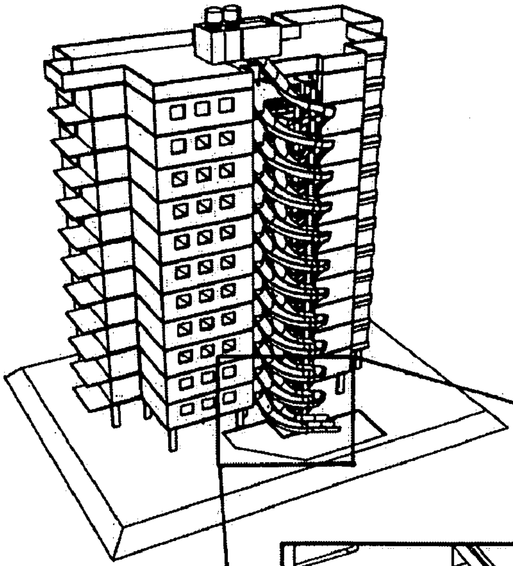
FIG. 5 is a perspective view of a building with a ramp system with two ramps installed.
Figure 5A:
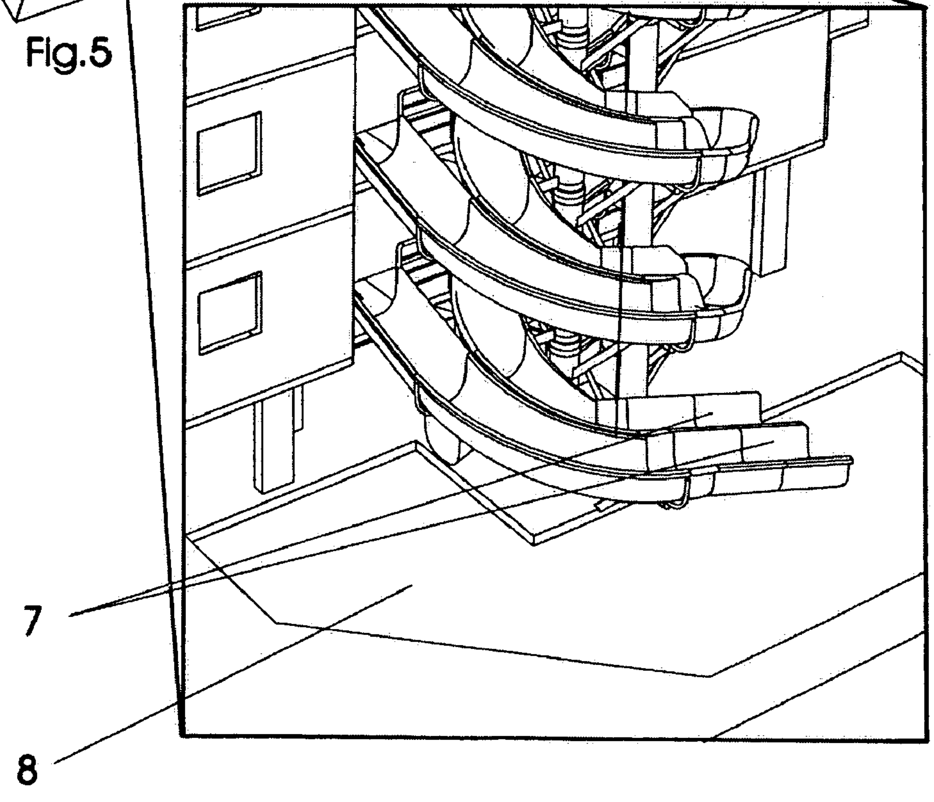
FIG. 5*a* is a detail view of the exit section of the ramp.

Referring first to FIGS. 1–5, the helical ramp emergency exit system of the present invention has at least one helical ramp supported by a metallic structure. The ramps are fixed on the building and are supported in the earth by pillars, blocks, and stakes (if necessary). Access to the ramps is provided through fire retardant doors 1 that lead from the building to attached catwalks 2. A safety railing 3 is mounted on the edge of the catwalks 2. The catwalks 2 are made of metal or concrete. The catwalks 2 provide easy access to the embarking platforms 4. The embarking platforms 4 feed in to the main body of the helical ramp 6. The helical ramp 6 winds around central supporting pillars, with straight and curved sections. the sections of the ramp 6 are supported by rigid braces 5 that are situated between the ramp 6 and the supporting pillars. People in the ramp 6 are visible from the catwalks 2, so that evacuation of the building is orderly. When people reach the outlet 7 of the ramp 6, they slide safely into a pool 8.

Figures 6, 6A:
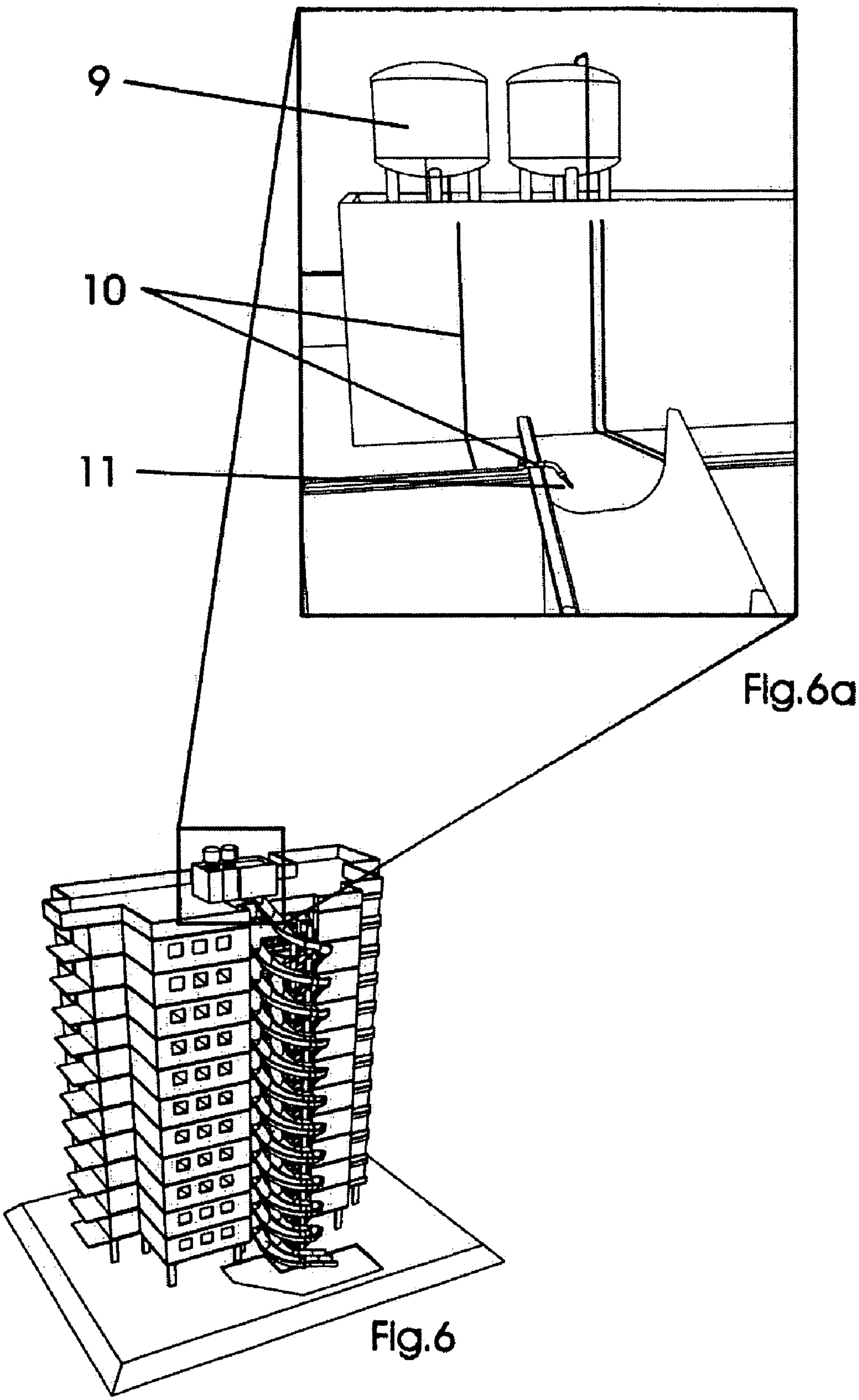
FIG. 6 is a perspective view of a building with a ramp system with two ramps installed.
FIG. 6*a* is a detail view of the water supply.
Figures 7, 7A:
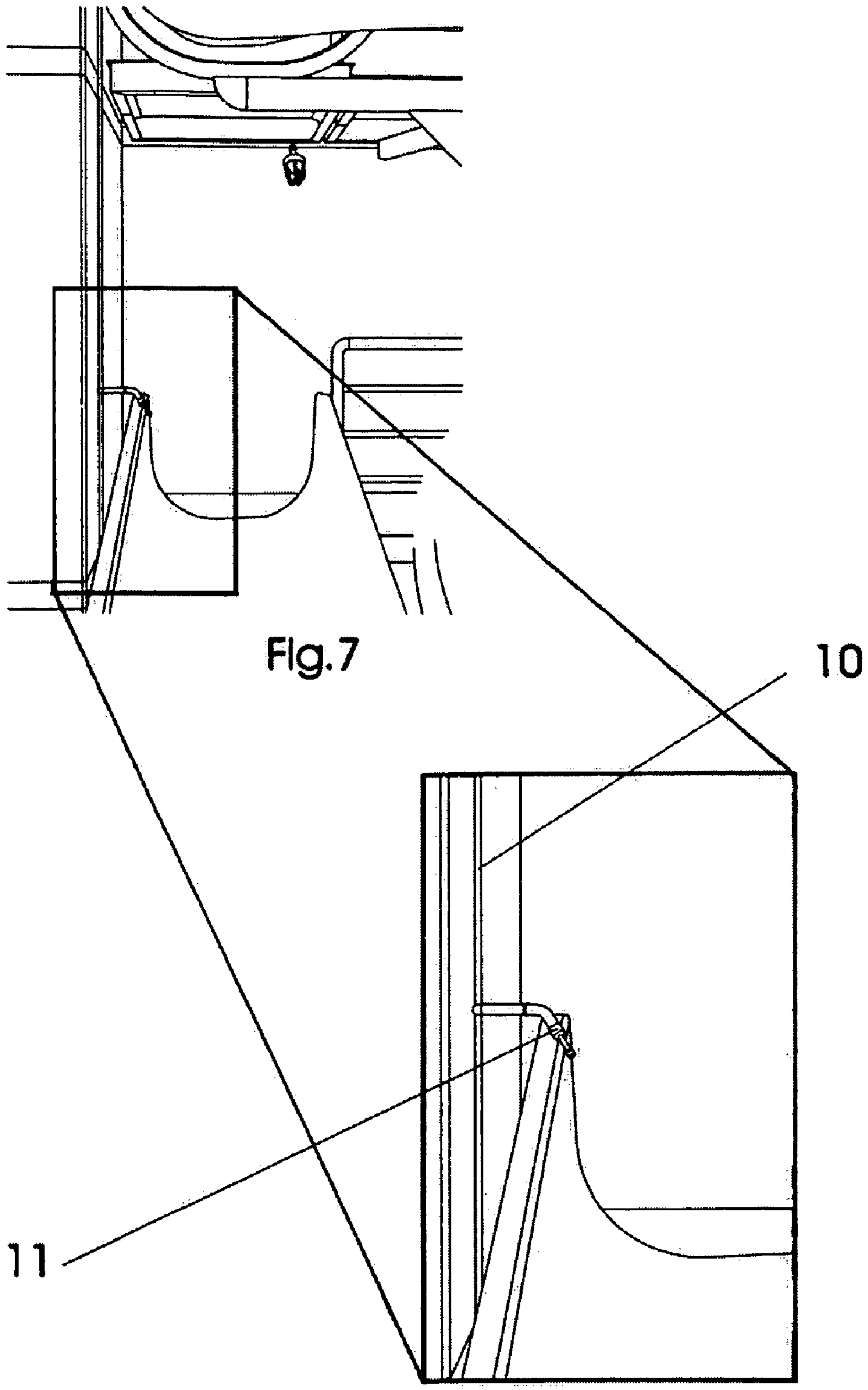
FIG. 7 shows the water supply route to the ramp.
FIG. 7*a* is a detail view of the outlined section in FIG. 7.
Figure 8:
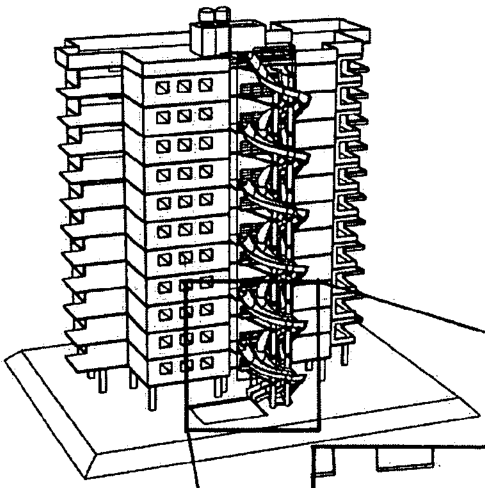
FIG. 8 is a perspective view of a building with a ramp system installed.
Figure 8A:
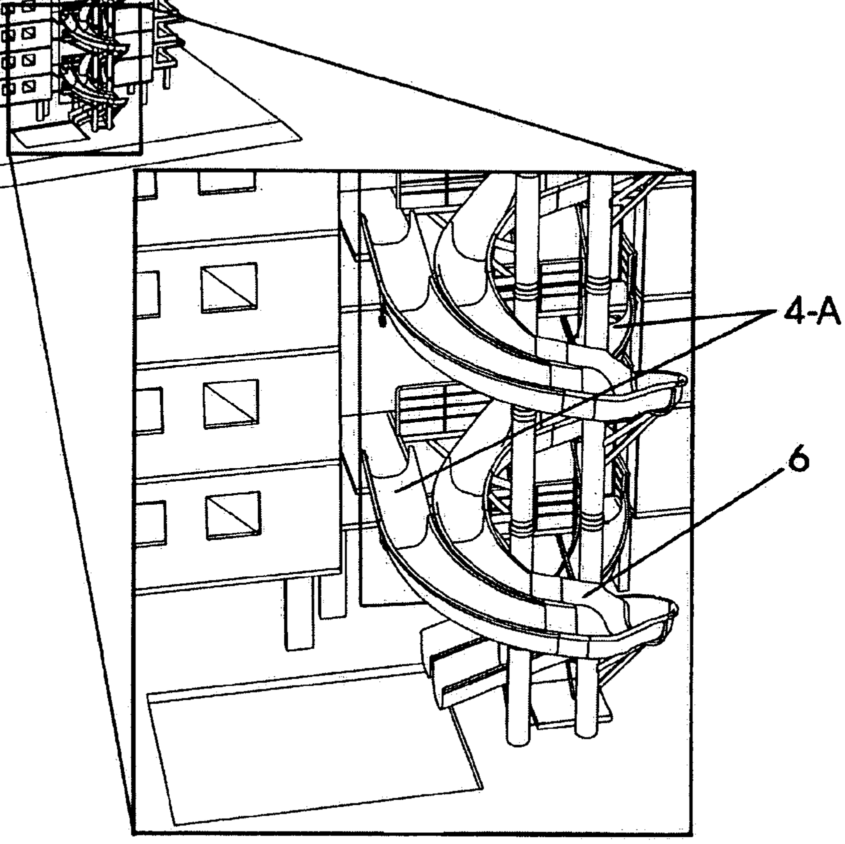
FIG. 8*a* is a detail view of the outlined section in FIG. 8.
Figure 9:
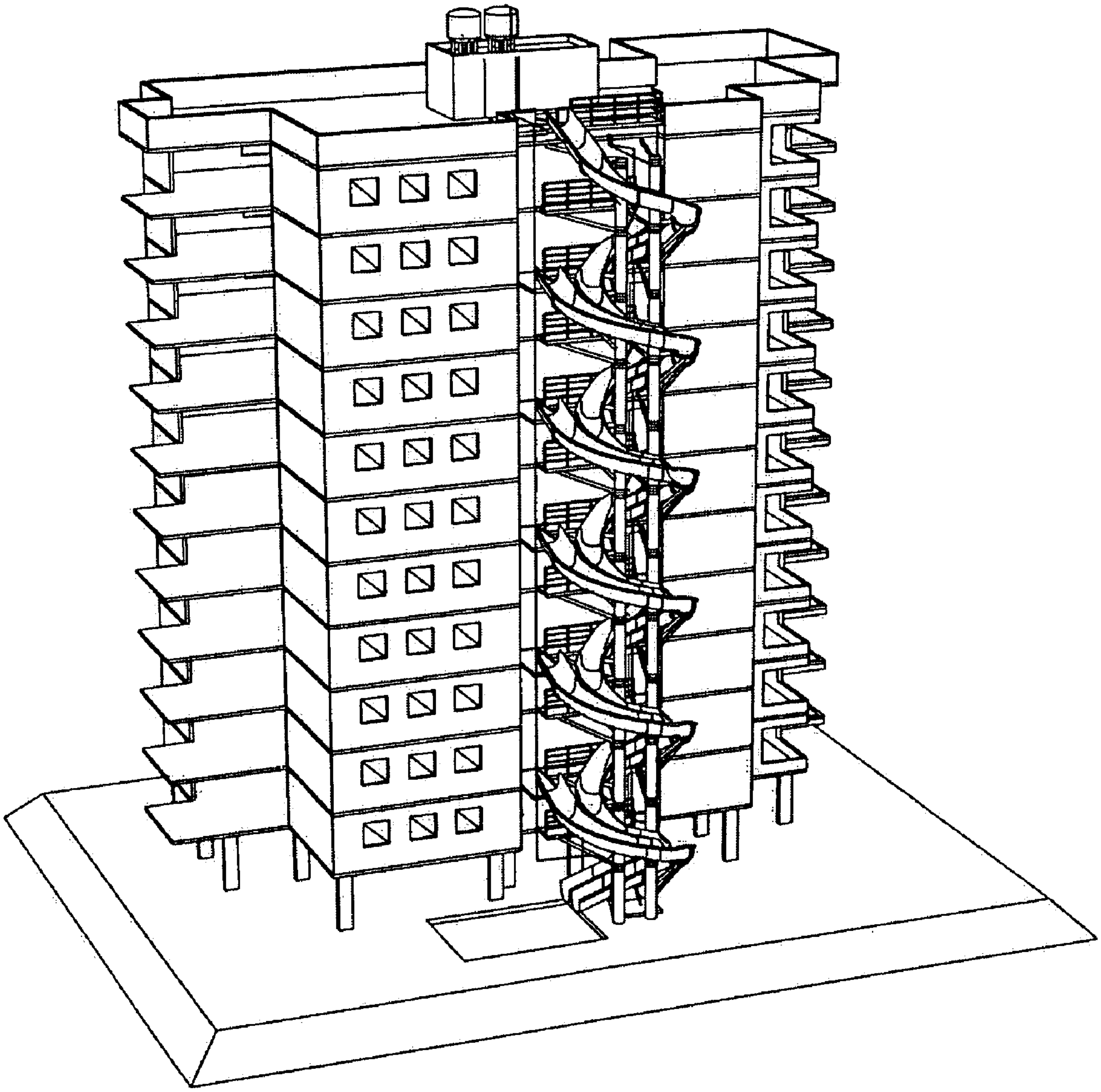
FIG. 9 is a perspective view of a building with a ramp system installed.

Referring now to FIGS. 6 and 7, water is supplied to the ramp 6 from reservoirs 9 placed on top of the building. The water flows through supply lines 10 and is directed into the embarking platforms 4 by jets 11. Supplying water to the ramp 6 greatly reduces the friction between the evacuees' bodies and the ramp 6.

The ramps 6 should have safety bars, such as a balustrade, along its course, so as to avoid falls. If possible, the ramp 6 should be placed at the rear of the building to reduce visibility.

As depicted in the drawings, a door 1 is provided on each floor of the building. The doors 1 provide access to the catwalks 2. The catwalks 2 can be made of any incombustible material, and should provide enough space to shelter the inhabitants of one or more floors of the building. It is preferable that the ramp 6 be installed on a portion of the building without windows, so that smoke and fire are inhibited from reaching the ramp 6. If windows are present, fireproof curtains can be utilized. The section of the building with the ramp 6 is designated exclusively for the rescue ramp 6. (The ramp 6 could be common to two buildings.)

In use, people in danger would run to the doors 1, and consequently to the catwalks 2. From there, they would have access to the ramp 6 via the embarking platforms 4. The ramp 6 is supported by pillars, and it can also be attached directly to the building.

The slope of the ramp 6 is calculated as a function of the distance between floors, with enough inclination to allow sliding without problems, but not so much inclination that unsafe speeds are reached. The purpose of the ramp 6 is to rescue the largest number of people possible. Each ramp 6 can evacuate approximately 48 people per minute. The ramp 6 provides easy access, requires little maintenance, and can be built with a minimum cost, because it doesn't have moving parts.

It should be noted that at the bottom of the ramp 6, the angle of the outlet 7 is chosen to allow the reduction of speed. The outlet 7 will typically be made from a material such as fiberglass mixed with asbestos cement or even steel. A sand pit or water pool 8 is provided at the end of the outlet 7 to provide space to get out of others' way, and so that people do not accumulate at the end of the outlet 7.

The water jets 11 will be controlled by the opening of the doors 1 themselves. Water is supplied from two dedicated water reservoirs 9. The size of the reservoirs 9 will be based on the size of the ramp 6 and the population of the building.

The cross section of the ramp 6 may be a "U", (FIG. 2, element 4-B), or semi-rectangular (FIG. 2, element 4-A), or the ramp 6 could be tubular, depending on the particular requirements of a given application. The materials for the ramp 6 can be metal, acrylic, polycarbonate, or other materials compatible with the safety and stability objectives.

The ramp 6 is irrigated by the water reservoirs 9 placed on the top of the building and fed by a pumping system with an independent generator, or through a solar energy system, or batteries. The ramp 6 must accommodate the flow of water by the force of gravity from the water reservoirs 9 placed on the top of the building. The feed pipes 10 extend along the whole ramp 6, with the water system being activated by the opening of any of the doors 1.

The ramp was designed for a building of 20 floors (60 m high), with a mean area of 500 $m^2$. It was assumed that there would be 1 person per each 25 $m^2$, or 20 people on each floor. Multiplied by 20 floors, we assume 400 people, with a 20% floating population (typical for apartment buildings), which results in 480 people to be evacuated. The estimated slide time for a height of 60 m at 12 m/s results in an individual slide time of 5 seconds (60/12=5). As the ramp 6 has enough space for two people at the same time, (or four people when two ramps 6 are coupled), in each interval of 1 second, 4 people could slide down. If we divide 480/4 and we multiply by 5, we arrive at the total time for the evacuation of the building as 600 seconds, or 10 minutes.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

The invention claimed is:

1. A device for emergency exit from a building comprising:

a helical ramp adjacent to a wall of the building, at least one means for access to said ramp from the building, a water supply that pumps water into said ramp when said water supply is triggered, said water supply including at least one reservoir located on a top of the building and a landing area at a lower end of said ramp: such that when evacuation of the building is desired, users enter said ramp via said means for access, slide down said ramp, and exit said ramp into said landing area to leave the building.

2. The device of claim 1 wherein:

said helical ramp comprises both straight and curved sections.

3. The device of claim 1 wherein:

said means for access to said ramp comprises a fire retardant door.

4. The device of claim 1 wherein:

said means for access to said ramp comprises a catwalk between a door from the building and an embarking platform that feeds into said ramp.

5. The device of claim 4 wherein:

said catwalk is bordered by a safety rail.

6. The device of claim 1 wherein:

said water supply includes at least one supply line that extends a length of said ramp.

7. The device of claim 1 wherein:

said water supply includes at least one jet that directs water onto said ramp.

8. The device of claim 1 wherein:

said ramp comprises an outlet area, said outlet area having an angle on inclination that slows users to a safe speed.

9. The device of claim 1 wherein:

said landing area comprises a water pool.

10. The device of claim 1 wherein:

said landing area comprises a sand pit.

11. The device of claim 1 wherein:

said device comprises two helical ramps installed in tandem.

12. The device of claim 1 wherein:

said ramp is affixed directly to the building.

13. The device of claim 1 wherein:

said ramp is supported by pillars.

* * * * *